United States Patent [19]

Derrien et al.

[11] 4,314,913
[45] Feb. 9, 1982

[54] CATALYST FOR REMOVING $NO_x$ FROM GAS STREAMS

[75] Inventors: Jean-Yves Derrien, Bourg-la-Reine; Laurent Seigneurin, Salindres, both of France

[73] Assignee: Rhone-Poulenc Industries, Paris, France

[21] Appl. No.: 127,106

[22] Filed: Mar. 4, 1980

[30] Foreign Application Priority Data

Mar. 5, 1979 [FR] France .............................. 79 05598

[51] Int. Cl.$^3$ ...................... B01J 21/04; B01J 23/22; B01J 23/74
[52] U.S. Cl. .............................. 252/464; 252/466 J; 423/239
[58] Field of Search ........................... 252/464, 466 J; 423/239 A

[56] References Cited

U.S. PATENT DOCUMENTS 3,279,884 10/1966 Nonnenmacher et al. ..... 423/239 A
3,864,451 2/1975 Lee et al. ...................... 423/239 A
4,164,546 8/1979 Welty ............................. 423/239 A

*Primary Examiner*—W. J. Shine
*Attorney, Agent, or Firm*—Burns, Doane, Swecker & Mathis

[57] ABSTRACT

Nitrogen oxides, $NO_x$, are depleted/removed from oxygen-containing gas streams comprising same, by contacting an admixture of ammonia and such gas streams, at elevated temperatures, with a catalyst which comprises a catalytically active metallic oxide deposited on a porous alumina support, said support comprising a volume of pores having diameters larger than 1000 Å in excess of 25 cm$^3$/100 g, a volume of pores having diameters larger than 300 Å in excess of 40 cm$^3$/100 g, a total pore volume of from about 80 cm$^3$/100 g to 120 cm$^3$/100 g, and a surface area of less than 160 m$^2$/g, said catalytically active metallic oxide being an oxide of a metal selected from the group consisting of vanadium, iron and cobalt, and said catalytically active metal oxide comprising from 0.5 to 20% by weight of the catalyst.

8 Claims, 1 Drawing Figure

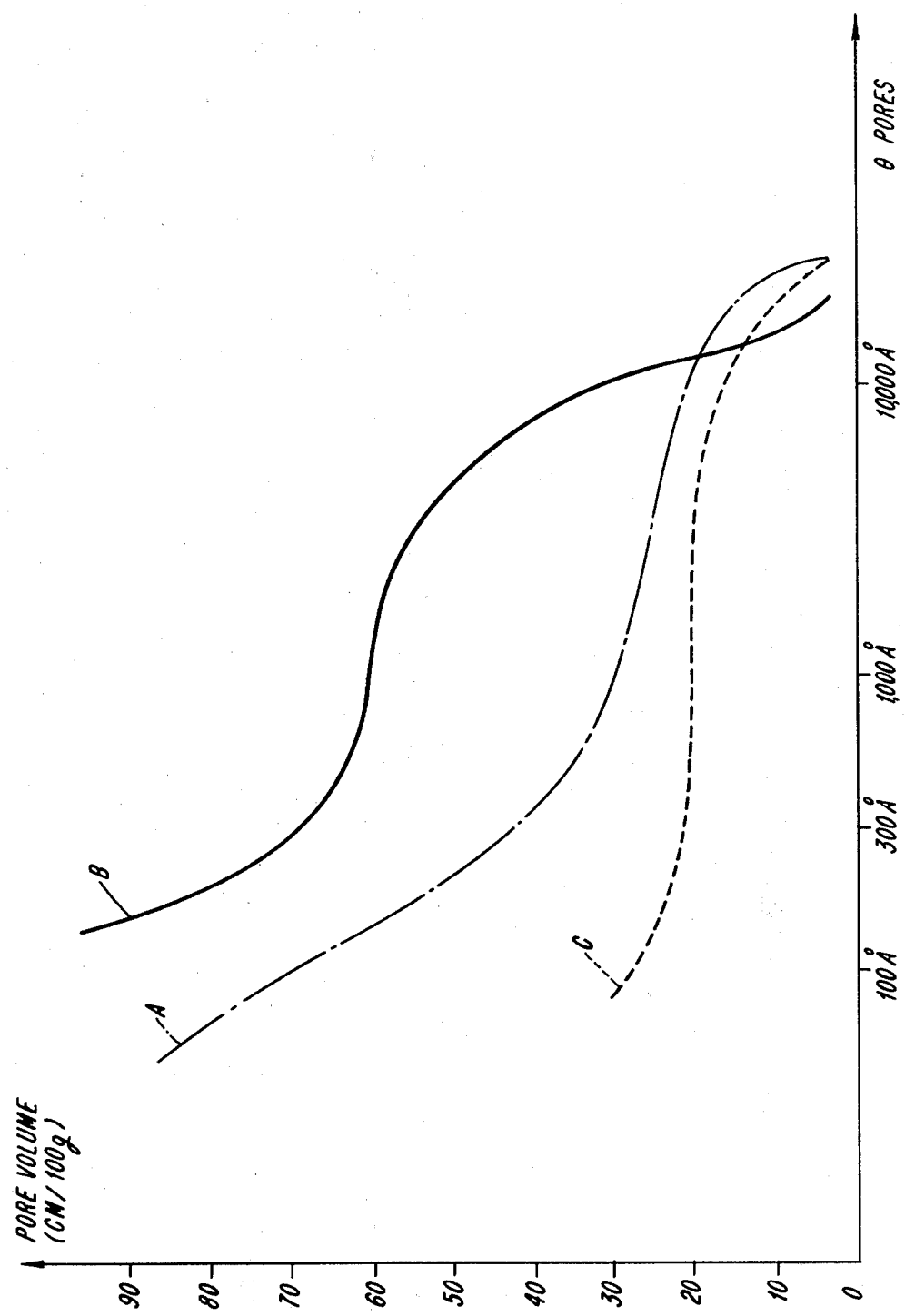

CATALYST FOR REMOVING NO$_x$ FROM GAS STREAMS

BACKGROUND OF THE INVENTION

1. Field of the Invention

The present invention relates to the removal of nitrogen oxides from gas streams comprising same, and, more especially, to the catalytic reduction of the nitrogen oxides in nitrogenous gases by means of ammonia, and whereby a gas stream essentially completely freed of nitrogen oxides (NO$_x$) results.

2. Description of the Prior Art

The synthesis of nitric acid via the oxygen oxidation of ammonia has long been known to this art. The initial reaction in the synthesis is conducted at elevated temperature and yields nitric oxide, NO, which is then itself oxidized with oxygen at a lower temperature to yield nitrogen dioxide, NO$_2$. This NO$_2$ is next in turn reacted with water in a dismutation reaction yielding nitric acid and nitric oxide in oxido/absorption columns. The nitric oxide is next in turn "reoxidized" by the residual oxygen and the process continues by dismutation.

A conventional nitric acid production plant typically comprises two absorption columns. In the second column, however, the partial pressure of the oxygen and the partial pressures of the nitrogen oxides (NO and NO$_2$) in the gaseous flow are such that the oxidation and absorption processes are slowed to the point where it would be necessary to markedly increase the number of plates in the column to eliminate the nitrogen oxides which are not converted to nitric acid and which are present in the residual gas flow. For this reason, in order to avoid exceedingly costly capital investment, the residual gases are discharged to the atmosphere and which gases comprise appreciable amounts of the nitrogen oxides, amounts of between 1,000 and 10,000 vpm. Such discharges, however, obviously present the serious problem of pollution of the environment. Consequently, various national laws recently promulgated required that such residual gases contain substantially lower amounts of the oxides of nitrogen (NO$_x$). Thus, the French standard currently mandates a discharge of less than 400 vpm, and the USA standard, a discharge of less than 255 vpm (vpm = volume per million)

For the foregoing reason, numerous processes have been proposed to reduce the NO$_x$ content of residual gaseous flows to permissible values.

It, too, has long been known to this art to catalytically reduce the content in nitrogen oxides of a gas stream containing oxygen, by means of ammonia in the presence of the platinum group metals; compare, for example, French Patent No. 1,205,311. However, at those temperatures necessary for such reduction, typically higher than 250° C., the catalyst rapidly loses its activity and at lower temperatures this activity is inadequate.

It is also known to the art to catalytically reduce nitrogen oxides with a gaseous stream of ammonia in the presence of a catalyst based on vanadium oxide (V$_2$O$_5$) borne by a porous support. Typically, this process requires a given NH$_3$/NO$_x$ molecular ratio (usually about 1) and for high hourly space velocities (VVH) on the order of 20,000 (VVH = volume of gas per volume of catalyst per hour) an inlet temperature for the gas to be purified and that is relatively high is required, typically in excess of 250° C., to obtain acceptable NO$_x$ conversion rates compatible with a substantial purification of the flow of the gas.

In the event that the temperature of the gas to be purified is less than 250° C., for example, about 200° C., the activity of the known catalysts, V$_2$O$_5$/Al$_2$O$_3$, is insufficient to afford acceptable pollution reduction rates, such as those dictated by the standards mentioned hereinabove, without supplementary heating and a substantial reduction in space velocity. Raising the temperature of the gas to be treated, for example, from 200° C. to 250° C., entails additional energy expenditures and, further, necessitates a reduction in the hourly space velocity, resulting in still additional investment expenditures due to the increase in the volume of the reactor.

It will thus be seen that there exists a significant need in this art for a catalyst and a pollution abatement process vis-a-vis the NO$_x$ contained in a gas flow, and desirably based upon an ammonia process affording direct treatment of the gaseous effluent, for example, from the absorption columns of a nitric acid production facility, and entailing a temperature of less than about 250° C. without the necessity for preliminarily reheating the gas, the reaction being effected in a reactor of the smallest possible volume in order to minimize the capital investment required.

SUMMARY OF THE INVENTION

Accordingly, a major object of the present invention is the provision of a novel catalyst for the reduction of nitrogen oxides contained in a flow of gas by means of ammonia, said catalyst comprising an alumina support having a surface area of less than 160 m$^2$/g, a volume of pores having diameters greater than 1000 Å in excess of 25 cm$^3$/100 g, and a volume of pores having diameters greater than 300 Å in excess of 40 cm$^3$/100 g with a total pore volume of between 80 cm$^3$/100 g and 120 cm$^3$/100 g, and an active catalytic phase comprising a metallic oxide selected from among the oxides of vanadium, iron and/or cobalt, in an amount of from 0.5 to 20%, preferably between 5% and 15% by weight, of the catalyst.

Another object of the present invention is the provision of a process for the treatment of a stream of gas containing nitrogen oxides by means of ammonia in the presence of the aforesaid catalyst, and whereby a gas flow substantially devoid of the nitrogen oxides is recovered.

Still another object of the present invention is the provision of a process for the cleaning of a stream of gas contaminated with the nitrogen oxides, said stream of gas being at a temperature of less than 250° C., by treatment with ammonia in the presence of said catalyst, the hourly space velocities being high, between 7,000 and 20,000.

BRIEF DESCRIPTION OF THE DRAWING

The FIGURE of Drawing is a graphical representation of pore volumes versus pore diameters of two alumina supports (A and B) according to the invention, and a comparative support C, all pore sizes having been measured by mercury porosimeter.

DETAILED DESCRIPTION OF THE INVENTION

More particularly, according to the invention, the stream of gas to be purified is conveniently a residual gas stream emanating from a conventional nitric acid process, the same typically being at a temperature of less than 250° C. and containing, in addition to the other species, nitrogen, an oxygen content typically between 10,000 vpm and 100,000 vpm and a content in nitrogen oxides ($NO + NO_2$) typically between 300 vpm and 10,000 vpm, more typically between 500 vpm and 2,000 vpm.

The catalytic support according to the invention advantageously is an alumina support, typically comprising the crystalline forms $\gamma$, $\theta$, $\delta$, and $\alpha$, with the forms $\theta$ and $\alpha$ usually predominating.

Also, the total pore volume of those pores having diameters larger than 1000 Å is in excess of 25 cm$^3$/100 g, and preferably is between 25 and 70 cm$^3$/100 g; the total pore volume of those pores having diameters larger than 300 Å is greater than 40 cm$^3$/100 g, preferably between 43 and 70 cm$^3$/100 g; and the total pore volume of said catalytic support is preferably between 80 and 120 cm$^3$/100 g.

Further, the total surface area of said catalyst is of less than 160 m$^2$/g, and preferably is between 90 and 150 m$^2$/g.

The catalyst of the invention comprises the aforementioned support and an active phase comprising a metallic oxide selected from the group consisting of the oxides of vanadium, iron and/or cobalt. Preferably, the catalyst comprises vanadium oxide, $V_2O_5$. The amount of vanadium oxide contained in the catalyst is typically between 0.5 and 20% by weight, preferably between 5 and 15% by total weight of the catalyst.

The process of the preparation of the catalyst is a known process, including the impregnation of the porous support with a solution of a metal compound which upon calcination yields the metal oxide. For example, the initial vanadium compound may be a vanadium oxide, or a vanadium complex such as vanadyl oxalate, or a vanadium salt such as ammonium metavanadate. The especially preferred vanadium compounds are salts which are soluble in water.

The catalyst of the present invention is prepared, for example, by mixing an aqueous solution of the vanadium compound with the alumina support in granular form, in order to effect the impregnation thereof, in proportions such that the final $V_2O_5$ content of the catalyst is within those limits outlined hereinabove. Subsequently, the impregnated support is dried and then calcined for a period of time of about 6 hours at a temperature of about 400° C.

The impregnating solution is preferably a solution obtained by dissolving vanadium pentoxide in an oxalic acid solution.

In order to effect the removal of the nitrogen oxides from gas streams comprising same per the invention, the catalyst is conveniently charged into any suitable fixed or fluid bed reactor.

The temperature utilized in conducting the process of the present invention varies with the space velocity per hour of the gases to be treated, but is typically between 180° C. and 400° C., preferably between 190° C. and 250° C. Outside the range of 180° to 400° C., the primary reaction is the formation of ammonium nitrate, or the reaction of oxygen with the ammonia, preferably through the reduction of the $NO_x$ by the ammonia.

The space velocity per hour (VVH) of the gases to be treated logically is a function of the temperature of the catalyst, a higher operating temperature permitting a greater VVH for a given result. Within the aforedefined range of temperatures, the VVH is typically between 5,000 and 250,000, preferably between 7,000 and 20,000.

The molar ratio $NH_3/NO_x$ is a function of the $NO_x$ depletion desired in the gas flow to be treated and the permissible discharge of ammonia therein, the two parameters being interrelated. Typically this ratio is less than 1.1 and preferably is between 0.8 and 1.0 depending upon the rate of conversion sought and the $NO_x$ content in the gas to be treated.

The pressure of the gaseous stream to be treated, all conditions being otherwise equal, favors the conversion of $NO_x$ into $N_2$. It conveniently is between 1 bar and 20 bars, preferably between 2 and 12 bars.

The catalyst and the process of the invention are especially well adapted for the treatment of residual gas streams discharged as effluent from the known process for the production of nitric acid by oxidation of ammonia. By observing the foregoing parameters according to this invention, it is quite easy to obtain a waste gas which meets the pollution standards noted hereinabove.

In order to further illustrate the present invention and the advantages thereof, the following specific examples are given, it being understood that same are intended only as illustrative and in nowise limitative.

EXAMPLES 1 AND 2 AND COMPARATIVE EXAMPLE

[A] Preparation of the Catalysts

From three alumina supports, A, B, and C, the support C being a known reference support, three catalysts $A_1$, $B_1$, $C_1$ were prepared, with the catalyst $C_1$ being the reference or comparative catalyst.

In the Table 1 which follows are reported characteristics of the initial supports.

TABLE I

| | Characteristics of the Alumina Supports | | | |
|---|---|---|---|---|
| | | Characteristics | | |
| | | Pore Volume, in cm$^3$/100g | | |
| Support | Surface m$^2$/g | $\phi$ >1000 Å | $\phi$ >300 Å | Crystalline structure |
| A, of Example 1 | 120 | 30 | 43 | Phases $\gamma$ and $\delta$, traces of phase $\alpha$ |
| B, of Example 1 | 150 | 60 | 68 | Phase $\theta$ predominant; small amount of $\delta$ phase; traces of phase $\alpha$ |
| C, of Comparative Example | 278 | 20 | 21 | Phase $\gamma_t$ and poorly crystallized transition alumina |

To prepare the impregnating solution of the vanadium compound, an aqueous solution of oxalic acid was prepared by dissolving 21 g oxalic acid in 40 cm$^3$ of water under agitation at 80° C. When the solution was clear, 10.13 g vanadium oxide, V₂O₅, were slowly poured therein, while controlling the rate of addition such as to avoid the formation of excessive amounts of foam. Upon completion of the addition, the mixture was maintained for one additional hour at 80° C.

Following cooling of the solution, 100 g of dry pellets of the alumina supports having diameters of 4 to 6 mm were impregnated in a dish therewith, with the total amount of the cooled solution being used. After impregnation, the pellets were dried for 18 hours in an oven heated to 140° C. and subsequently calcined for 2 hours at 250° C. and for 3 hours at 350° C.

The catalysts $A_1$, $B_1$, $C_1$ respectively prepared from the supports A, B and C, contained the following, respectively:

| [i]   | Catalyst $A_1$ | 8.5% $V_2O_5$ |
|-------|----------------|---------------|
| [ii]  | Catalyst $B_1$ | 8% $V_2O_5$   |
| [iii] | Catalyst $C_1$ | 9% $V_2O_5$   |

[B] Testing of the Catalysts and Results

The catalysts were tested in an apparatus comprising controlled feeds with respect to pressure and the feed rates of the nitrogen, NO and NO₂, ammonia and air, and including preheaters for the several gases. The gaseous flow resulting from the mixture was fed to a fixed bed reactor which was isolated and equipped with a thermostat, then conveyed into a trap containing phosphoric acid, and ultimately diverted to a Beckman luminescent measuring apparatus (Model 951), wherein the chemical species in the resulting flow were determined.

The rate of conversion, TT, was then calculated.

$$TT = \frac{\text{amount of inlet } NO_x - \text{amount of outlet } NO_x}{\text{amount of inlet } NO_x}$$

The results obtained are reported in the Table II which follows, utilizing the same gas containing:

| [i]  | 2000 vpm | $NO_x$ |
|------|----------|--------|
| [ii] | 3%       | Oxygen | and with an hourly spaced velocity of 20,000, the catalyst bed having a temperature of 230° C. and the pressure of the gas to be treated being 2 bars absolute, for two values of the molecular ratio $NH_3/NO_x$.

TABLE II

| Catalyst | Parameter and Result Molecular Ratio $NH_3/NO_x$ | Rate of Conversion of the $NO_x$ TT in % |
|----------|-------------------------------------------------|------------------------------------------|
| $A_1$    | 0.9                                             | 79                                       |
|          | 1.1                                             | 83                                       |
| $B_1$    | 0.9                                             | 83.5                                     |
|          | 1.1                                             | 87.5                                     |
| $C_1$    | 0.9                                             | 67                                       |
|          | 1.1                                             | 69                                       |

EXAMPLE 3

In this example, the effect of the amount of V₂O₅ in the catalyst on the rate of conversion of the $NO_x$, all conditions being otherwise equal, was demonstrated.

Three catalysts were prepared on the alumina support B, defined as in the preceding examples. The impregnation was effected in a manner similar to that described hereinabove to obtain three catalysts having increasing amounts of V₂O₅ contents.

The catalysts were tested as above, under the following conditions:

| [i]   | Hourly space velocity | 20,000          |
|-------|-----------------------|-----------------|
| [ii]  | Pressure              | 2 bars, absolute |
| [iii] | Catalyst temperature  | 230° C.         |
| [iv]  | $NH_3/NO_x$ ratio     | 1.1             |

The results are compiled in the Table III which follows:

TABLE III

| $V_2O_5$ (%) Content in Catalyst | Rate of $NO_x$ Conversion TT in % |
|----------------------------------|-----------------------------------|
| 8                                | 88                                |
| 10                               | 91                                |
| 15                               | 93                                |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A catalyst which comprises a catalytically active metallic oxide deposited on a porous support with the metallic oxide being selected from the group consisting of the oxides of vanadium, iron and cobalt and with the metallic oxide comprising from 0.5 to 20% by weight of the catalyst, wherein the improvement comprises said support being a porous alumina support and comprising a volume of pores having diameters larger than 1000 Å in excess of 25 cm³/100 g, a volume of pores having diameters larger than 300 Å in excess of 40 cm³/100 g, a total pore volume of from about 80 cm³/100 g to 120 cm³/100 g, and a surface area of less than 160 m²/g.

2. The catalyst as defined by claim 1, wherein in the support the volume of pores having diameters larger than 1000 Å ranges between 25 and 70 cm³/100 g, and the volume of pores having diameters larger than 300 Å ranges between 43 and 70 cm³/100 g.

3. The catalyst as defined by claims 1 or 2, wherein the surface area of the alumina support ranges between 90 and 150 m²/g.

4. The catalyst as defined by claim 1, wherein the alumina support comprises the crystalline phases γ, θ, δ, and α.

5. The catalyst as defined by claim 4, said catalytically active metal oxide comprising from 5 to 15% by weight of the catalyst.

6. The catalyst as defined by claim 4, wherein in the support the volume of pores having diameters larger than 1000 Å is about 60 cm³/100 g, the volume of pores having diameters larger than 300 Å is about 68 cm³/100 g, and the surface area thereof is about 150 m²/g.

7. The catalyst as defined by claim 4, wherein in the support the volume of pores having diameters larger than 1000 Å is in excess of 30 cm³/100 g, the volume of pores having diameters larger than 300 Å is in excess of 43 cm³/100 g, and the surface area thereof is about 120 m²/g.

8. The catalyst as defined by claim 1, said catalytically active metallic oxide being vanadium oxide.

* * * * *